United States Patent
Braasch et al.

(10) Patent No.: US 7,274,464 B2
(45) Date of Patent: Sep. 25, 2007

(54) POSITION MEASURING DEVICE

(75) Inventors: Jan Braasch, Trostberg (DE);
Wolfgang Holzapfel, Obing (DE);
Volker Seyfried, Nussloch (DE);
Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 395 days.

(21) Appl. No.: 10/493,153

(22) PCT Filed: Oct. 16, 2002

(86) PCT No.: PCT/EP02/11544

§ 371 (c)(1),
(2), (4) Date: Sep. 27, 2004

(87) PCT Pub. No.: WO03/036226

PCT Pub. Date: May 1, 2003

(65) Prior Publication Data

US 2005/0018205 A1    Jan. 27, 2005

(30) Foreign Application Priority Data

Oct. 23, 2001  (DE) ............................... 101 51 563

(51) Int. Cl.
G01B 11/02 (2006.01)
G01B 9/02 (2006.01)
G01D 5/36 (2006.01)

(52) U.S. Cl. .................. 356/508; 356/499; 250/237 G

(58) Field of Classification Search ................ 356/488, 356/494, 499, 521, 486, 487, 493, 498, 508; 250/231.13, 237 G See application file for complete search history.

(56) References Cited

U.S. PATENT DOCUMENTS 3,891,321 A * 6/1975 Hock .......................... 356/488
4,053,239 A * 10/1977 Tolmon ...................... 356/250

(Continued)

FOREIGN PATENT DOCUMENTS

DE  35 04 464 C1  4/1986

(Continued)

Primary Examiner—Gregory J. Toatley, Jr.
Assistant Examiner—Patrick Connolly
(74) Attorney, Agent, or Firm—Brinks Hofer Gilson & Lione

(57) ABSTRACT

A position measuring device for detecting the spatial position of a movable element in relation to a base body, the device including a linear measuring device that measures a distance between a movable element and a base body and an angle-measuring apparatus that measures an angle between the movable element and the base body. A light source that directs light along a beam path, a detector within the beam path and a grating within the beam path between the light source and the detector. For measuring the angle, the beam path extends between the movable element and the base body so that an intensity strip pattern is created by illuminating the grating by the light source, whose position relative to the detector is a measure of the angle.

18 Claims, 4 Drawing Sheets

U.S. PATENT DOCUMENTS

| | | | |
|---|---|---|---|
| 5,196,900 A * | 3/1993 | Pettersen | 356/141.4 |
| 5,198,663 A * | 3/1993 | Ichikawa et al. | 250/231.1 |
| 5,327,218 A * | 7/1994 | Igaki | 356/499 |
| 5,616,917 A * | 4/1997 | Dai | 250/237 G |
| 5,741,113 A * | 4/1998 | Bacchi et al. | 414/744.5 |
| 5,765,444 A * | 6/1998 | Bacchi et al. | 74/490.03 |
| 5,909,939 A | 6/1999 | Fugmann | |
| 5,944,476 A * | 8/1999 | Bacchi et al. | 414/783 |
| 5,981,965 A * | 11/1999 | Pryor et al. | 250/559.23 |
| 6,080,039 A * | 6/2000 | Bartlett et al. | 451/9 |
| 6,098,484 A * | 8/2000 | Bacchi et al. | 74/490.03 |
| 6,105,454 A * | 8/2000 | Bacchi et al. | 74/490.03 |
| 6,126,381 A * | 10/2000 | Bacchi et al. | 414/754 |
| 6,155,768 A * | 12/2000 | Bacchi et al. | 414/416.03 |
| 6,211,506 B1 * | 4/2001 | Pryor et al. | 250/208.1 |
| 6,297,497 B1 * | 10/2001 | Braunecker et al. | 250/216 |
| 6,756,581 B2 * | 6/2004 | Ohtomo et al. | 250/231.13 |
| 2006/0279794 A1 * | 12/2006 | Jurgensen | 358/3.29 |

FOREIGN PATENT DOCUMENTS

| | | |
|---|---|---|
| DE | 197 03 735 A1 | 8/1998 |
| DE | 195 34 535 C2 | 5/2000 |
| WO | WO 01/38828 A1 | 5/2001 |

\* cited by examiner

POSITION MEASURING DEVICE

Applicants claim, under 35 U.S.C. 120 and 365, the benefit of priority of the filing date of Oct. 16, 2002 of a Patent Cooperation Treaty patent application, copy attached, Serial Number PCT/EP02/11544, filed on the aforementioned date, the entire contents of which are incorporated herein by reference, wherein Patent Cooperation Treaty patent application Serial Number PCT/EP02/11544 was not published under PCT Article 21(2) in English.

Applicants claim, under 35 U.S.C. 119, the benefit of priority of the filing date of Oct. 23, 2001 of a German patent application, copy attached, Serial Number 101 51 563.4, filed on the aforementioned date, the entire contents of which are incorporated herein by reference.

BACKGROUND OF THE INVENTION

1. Field of the Invention

The present invention relates to a position measuring device for detecting the position of a movable element in relation to a base body.

2. Description of the Related Art

Position measuring devices are known from both DE 195 34 535 C2 and DE 35 04464 C1, by which the spatial position of a movable element in relation to a base body is determined by several telescoping rods, which are spatially arranged with respect to each other, through linear measurements in the telescoping rods. In DE 35 04 464 C1 the purpose of such a position measuring device is said to be the checking of the positioning accuracy of a program-controlled device arm.

The disadvantage of these position measuring devices lies in the arrangement of several telescoping rods for determining the position of the movable element in three degrees of freedom. The telescoping rods must be arranged in a predetermined manner with respect to each other in order to determine the spatial position of the movable element by a predetermined calculation rule from the connection between the lengths of the telescoping rods.

SUMMARY AND OBJECTS OF THE INVENTION

It is therefore an object of the present invention to simplify the structure of a position measuring device for detecting the position of a movable element in relation to a base body.

This object is attained by a position measuring device for detecting the spatial position of a movable element in relation to a base body, the device including a linear measuring device that measures a distance between a movable element and a base body and an angle-measuring apparatus that measures an angle between the movable element and the base body. A light source that directs light along a beam path, a detector within the beam path and a grating within the beam path between the light source and the detector. For measuring the angle, the beam path extends between the movable element and the base body so that an intensity strip pattern is created by illuminating the grating by the light source, whose position relative to the detector is a measure of the angle.

An advantage of the present invention is perceived to lie in that the movement of the movable element in at least three degrees of freedom, namely a translational and two rotational ones, can be measured by a single telescoping leg of simple construction.

Details and further advantages ensue from the following description of exemplary embodiments by the drawings.

Shown are in:

DESCRIPTION OF THE PREFERRED EMBODIMENT(S) OF THE INVENTION

Figure 1:
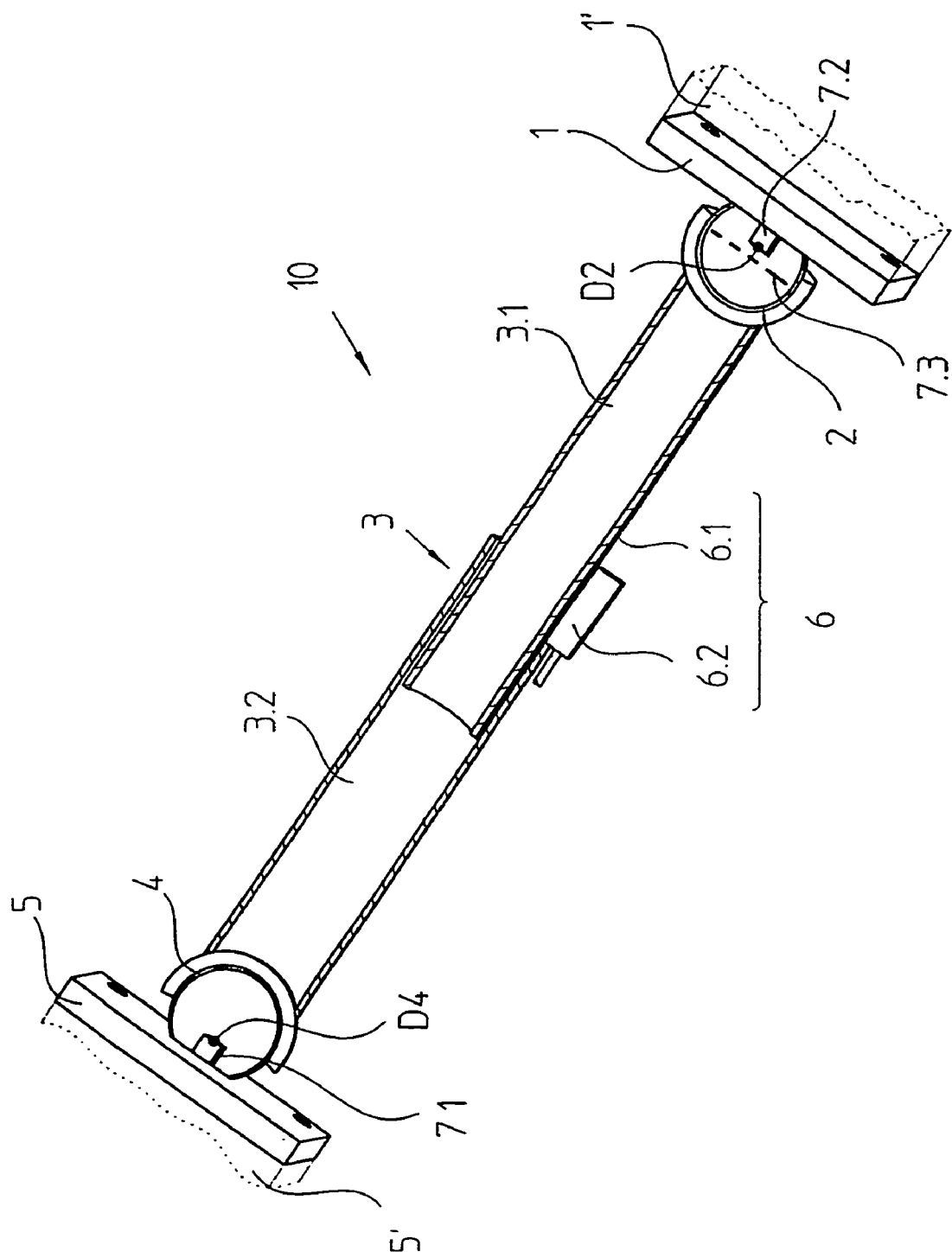
FIG. 1 shows an embodiment of a position measuring device for measuring the spatial position of a moved element in accordance with the present invention.

The basic structure of a position measuring device 10 in accordance with the present invention is schematically represented in FIG. 1. It includes a base body 1 with a joint 2, by which a support 3 is seated, pivotable in all directions, on the base body 1. The support 3 is embodied telescopingly and includes least two tubes 3.1 and 3.2, which can be pushed into each other. The one tube 3.1 is seated as a telescope element on the joint 2, and the other tube 3.2 is seated, pivotable in all directions, by a further joint 4 on the element 5 to be measured.

Figure 5:
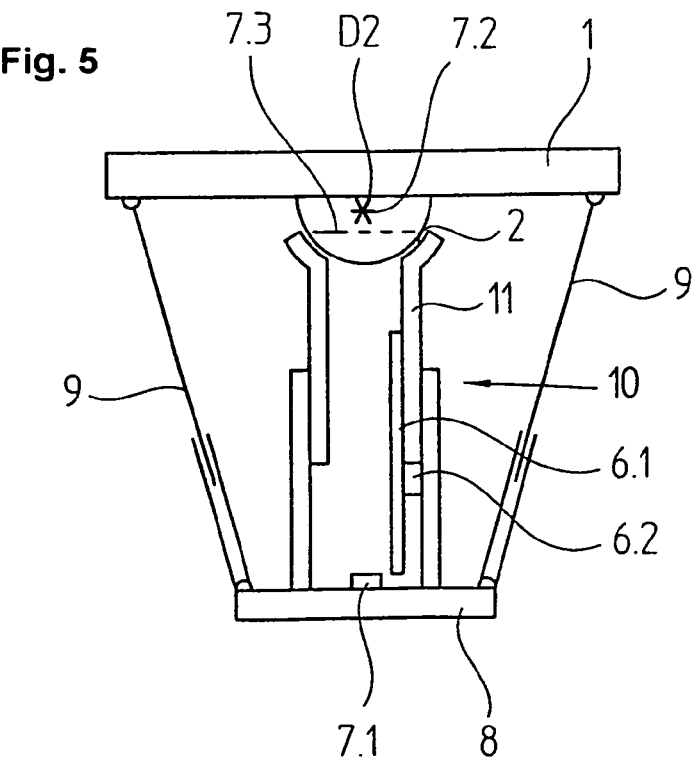
FIG. 5 illustrates a possible use of the position measuring devices of FIGS. 1-3 in a machine.

The movement of the element 5 in the longitudinal direction of the support 3 is measured by a linear measuring device 6. The latter includes a scale 6.1 fastened on one of the tubes 3.1, and of a scanning element 6.2 fastened on the other tube 3.2. Several such linear measuring devices can be employed for redundant measuring and these are in particular arranged symmetrically with respect to a centered connecting line located between the two joints 2, 4, such as represented in FIG. 5 of DE 197 03 735 C2.

Figure 2:
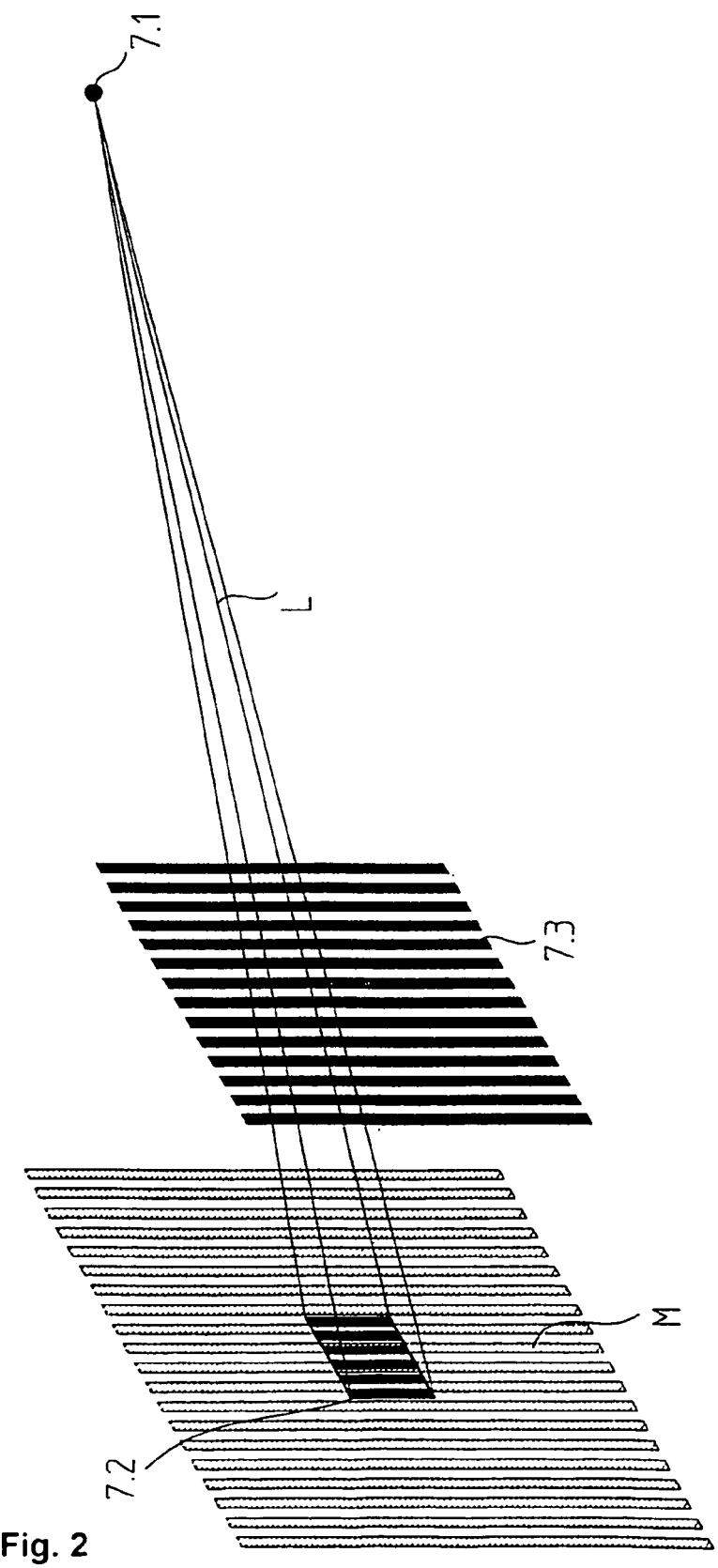
FIG. 2 shows a functional principle of the angle-measuring apparatus of the position measuring device in FIG. 1.

The lateral displacement of the element 5 in relation to the base body 1 results in a pivot movement of the support 3 with respect to the base body 1. This pivot movement is measured by an angle-measuring apparatus 7. The latter includes a light source 7.1, a detector 7.2 and a grating 7.3. The light source 7.1 is fixedly arranged in the center of rotation D4 of the joint 4 on the element 5 and transmits a divergent light beam L along the support 3 (FIG. 2). The detector 7.2 is located inside the light beam L in the center of rotation D2 of the joint 2 on the base body. The grating 7.3 is located at a fixed distance in front of the detector 7.2 and is also fastened on the base body 1 and in this way is fixedly assigned to the detector 7.2. By illuminating the grating 7.3 by the divergent light beam L, an intensity strip pattern M is generated, whose position in relation to the detector 7.2 is a measure of the pivot movement of the support 3, and therefore of the lateral displacement of the element 5.

Because of the arrangement of the light source 7.1 and the detector 7.2 directly on the base body 1, or the element 5 to be measured, errors in the joints 2 and 4, as well as translational errors of the support 3 do not enter into the angular measurement. The beam path for angular measurement extends between the movable element 5 and the base body 1. Here, the light source 7.1 is arranged in one of the centers of rotation D2, D4, and the center of the light-sensitive elements of the detector 7.2 in the other one of the centers of rotation D4, D2. It is possible in a manner not represented to arrange the light source 7.1, as well as the detector 7.2, in one center of rotation D2, D4, and a retro-reflecting element in the other center of rotation D4, D2. Beam splitting is advantageous in connection with this, so that the light beam passes through the grating 7.3 in only one direction. In that case the detector 7.2 or the light source 7.1 is located at the site of the center of rotation D2 or D4 which is mirrored or depicted by the beam splitter. The grating 7.3 is spatially fixedly assigned either to the light source 7.1 or the detector 7.2.

For measuring the lateral displacement of the element 5 in all directions transversely to the longitudinal direction of the support 3, i.e. the pivot angle of the element 5 around the center of rotation D2, the grating 7.3 is a two-dimensional structure, for example a two-dimensional cross grating, so that a two-dimensional intensity pattern M is created during illumination, whose position relative to the detector 7.2 is a measure for the angle of the element 5 with respect to the base body 1.

The detector 7.2 preferably includes several light-sensitive elements for generating several electrical sinusoidal scanning signals which are phase-shifted in relation to each other. In the illustrated example, the planar center of the light-sensitive elements for generating a scanning signal is respectively located in the center of rotation D2.

The principle of angle measuring, known per se from WO 01/38828 A1, is represented in FIG. 2 by a one-dimensional grating 7.3. Reference is expressly made to the disclosure of WO 01/38828 A1 regarding details of the principle.

The joints 2 and 4 are gimbal-mounted joints or magnetically prestressed ball joints without play as described in DE 35 04 464 C1 mentioned at the beginning.

Advantageously the support 3 constitutes a linear guide of the scanning unit 6.2 with respect to the scale 6. The support 3 furthermore constitutes a covering for the angle-measuring apparatus 7 and protects it against extraneous light and the effects of the environment.

Figure 3:
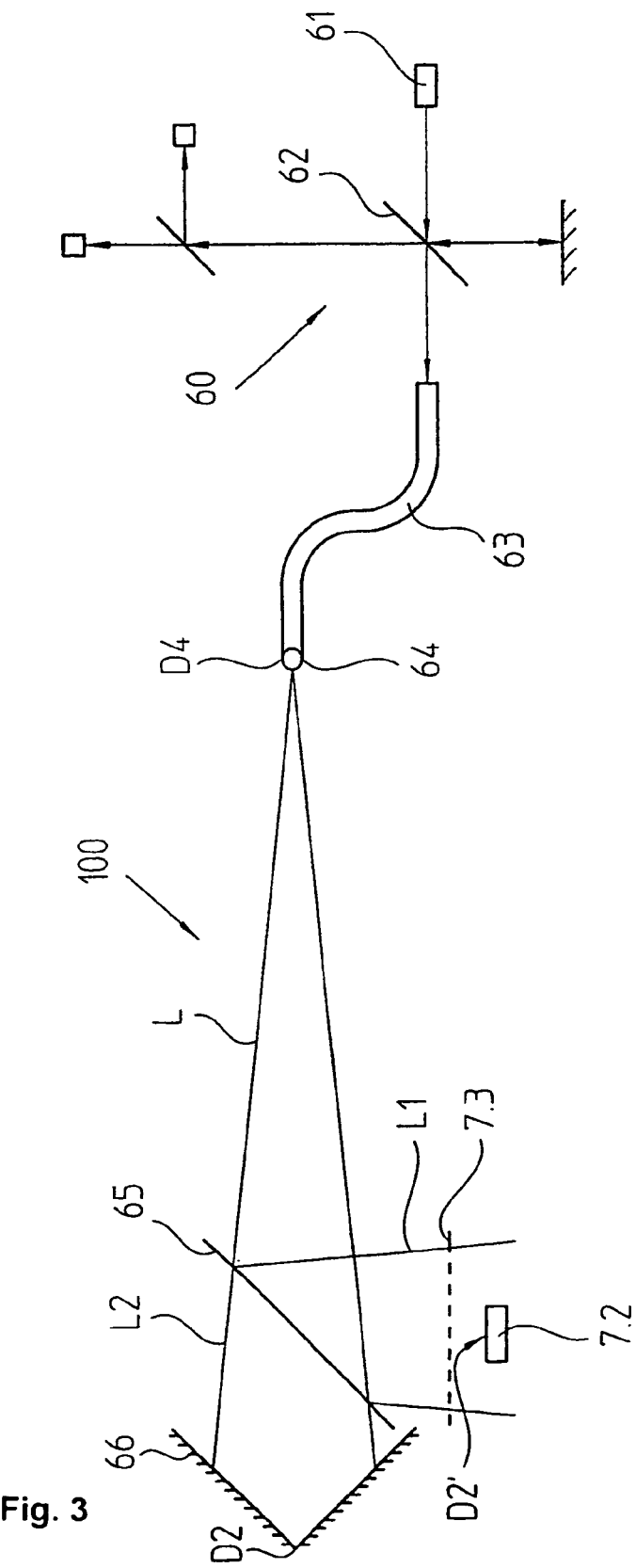
FIG. 3 shows a further embodiment of a position measuring device for measuring the spatial position of a moved element by interferometric linear measurements in accordance with the present invention.

A further exemplary embodiment of a position measuring device 100 is represented in FIG. 3. Here, an interferometer 60 is employed as the linear measuring device. It includes for example, of a laser 61, a beam splitter 62 and, as a light source, a fiber-optical waveguide 63 with a ball head 64. The ball head 64 is located in the center of rotation D4. The diverging light beam L reaches a beam splitter 65 for generating two light portions L1 and L2. The one light portion L1 is used for the above described angle measurement in that the diverging light beam L1 is modulated as a function of the grating 7.3 and the intensity pattern M is detected by a detector 7.2. The other light portion L2 reaches a retro-reflector 66, is reflected there and again coupled into the fiber-optical waveguide 63. The evaluation of the reflected light beam L2 and the interferential determination of the linear displacement of the movable element 5 with respect to the base body 1 along the support 3, not represented in FIG. 3, takes place in a manner known per Se.

The center of the retro-reflector 66 is located in the center of rotation D2, and the detector 7.2 in the image D2', generated by the beam splitter 65, of the center of rotation D2. The reverse is also possible, so that then the detector 7.2 is located in the center of rotation D2 and the center of the retro-reflector 66 in the image D2'.

The above-described position measuring devices 10, 100 are advantageously employed for checking the positioning accuracy of a program-controlled machine element, in that the movable element 5 is fixed in place on the program-controlled machine element, for example a device arm of a robot or a spindle of a machine tool, and the base body 1 is fixed in place on a base element of the machine, i.e. the workpiece support of a machine tool. The spindle 5' of a machine tool, as well as the workpiece support 1' are represented schematically by dashed lines in FIG. 1.

Figure 4:
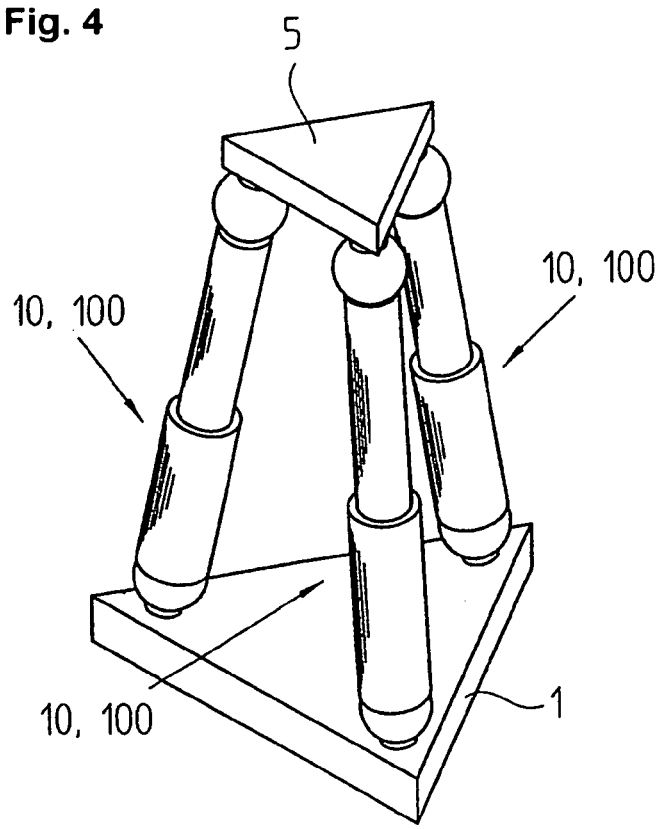
FIG. 4 illustrates a possible use of the position measuring devices of FIGS. 1-3 for detecting a moved element in six degrees of freedom.

The employment of the above described position measuring devices 10 or 100 for detecting a moved element in six degrees of freedom is represented in FIG. 4. Three telescope-like position measuring devices 10 or 100 are hingedly arranged on one side on the base body 1, and hingedly on the element 5 on the other side for detecting the spatial position of the element 5, as well as the orientation of the plate-shaped element 5 in regard to the base body 1.

If only five degrees of freedom are to be detected, two position measuring devices 10 or 100 are sufficient.

A further use of the position measuring device 10 or 100 is represented by way of example in FIG. 5. The spatial position, as well as the orientation, of a spindle support 8 of a machine tool can be adjusted by means of several length-adjustable struts 9. The spindle support 8 can be pivoted in all directions via a central column 11 and is hinged in a length-adjustable manner on the base body 1. The inclination of the central column 11, and therefore the orientation of the spindle support 8 with respect to the center of rotation D2, as well as the linear displacement of the spindle support 8 in the direction of the longitudinal axis of the central column 11, can be measured by a position measuring device 10 or 100 in accordance with the present invention.

Further embodiment variations of the method in accordance with the present invention of course exist besides the explained example.

The invention claimed is:

1. A position measuring device for detecting the spatial position of a movable element in relation to a base body, comprising:
    a linear measuring device that measures a distance between a movable element and a base body;
    a length-adjustable support connecting said movable element with said base body;
    a joint, by which said support is seated, pivotable in all directions around a center of rotation, in said base body, wherein said linear measuring device measures said linear displacement along said support;
    an angle-measuring apparatus that measures a pivoting angle between said support and said base body;
    a light source that directs light along a beam path;
    a detector within said beam path; and
    a grating within said beam path between said light source and said detector, wherein for measuring said pivoting angle said beam path extends between said movable element and said base body so that an intensity strip pattern is created by illuminating said grating by said light source, whose position relative to said detector is a measure of said pivoting angle.

2. The position measuring device in accordance with claim 1, further comprising a second joint that is arranged between said support and said movable element, by which said movable element is seated, pivotable around a second center of rotation, on said support.

3. The position measuring device in accordance with claim 1, wherein said light source is arranged in said center of rotation.

4. The position measuring device in accordance with claim 1, wherein a center of light-sensitive elements of said detector is arranged in said center of rotation.

5. The position measuring device in accordance with claim 2, wherein said light source is arranged in said center of rotation, and a center of light-sensitive elements of said detector is arranged in said second center of rotation.

6. The position measuring device in accordance with claim 1, wherein said joint is a gimbal-mounted joint.

7. The position measuring device in accordance with claim 2, wherein said joint is a gimbal-mounted joint and said second joint is a gimbal-mounted joint.

8. The position measuring device in accordance with claim 1, wherein said joint is a magnetically prestressed ball joint.

9. The position measuring device in accordance with claim 1, wherein said joint is a magnetically prestressed ball joint and said second joint is a magnetically prestressed ball joint.

10. The position measuring device in accordance with claim 1, further comprising:
   a scanning unit of said linear measuring device; and
   wherein said support comprises:
      a first telescoping element comprising a scale attached thereto;
      a second telescoping element telescopically attached to said first telescoping element, wherein said scanning unit is fastened on said second telescoping element and said scanning unit scans said scale; and
      a cover for said angle-measuring apparatus.

11. The position measuring device in accordance with claim 1, wherein said linear measuring device is an interferometer.

12. The position measuring device in accordance with claim 11, wherein said light is split into a first partial beam for said angle-measuring apparatus and a second partial beam for said linear measuring device.

13. The position measuring device in accordance with claim 1, wherein said grating is a two-dimensional cross grating that generates a two-dimensional intensity pattern, whose position in relation to said detector is a measure of said angle.

14. A position measuring system comprising:
   a program-controlled machine comprising:
      a base element; and
      a movable portion that moves relative to said base;
   a position measuring device comprising:
      a linear measuring device that measures a distance between a movable element that is fixed to said base element and a base body that is fixed to said base element;
      a length-adjustable support connecting said movable element with said base body;
      a joint, by which said support is seated, pivotable in all directions around a center of rotation, in said base body, wherein said linear measuring device measures said linear displacement along said support.
      an angle-measuring apparatus that measures a pivoting angle between said movable element and said support;
      a light source that directs light along a beam path;
      a detector within said beam path; and
      a grating within said beam path between said light source and said detector, wherein for measuring said pivoting angle said beam path extends between said movable element and said base body so that an intensity strip pattern is created by illuminating said grating by said light source, whose position relative to said detector is a measure of said pivoting angle.

15. The position measuring system in accordance with claim 14, further comprising a second joint that is arranged between said support and said movable element, by which said movable element is seated, pivotable around a second center of rotation, on said support.

16. The position measuring system in accordance with claim 14, further comprising:
   a scanning unit of said linear measuring device; and
   wherein said support comprises:
      a first telescoping element comprising a scale attached thereto;
      a second telescoping element telescopically attached to said first telescoping element, wherein said scanning unit is fastened on said second telescoping element and said scanning unit scans said scale; and
      a cover for said angle-measuring apparatus.

17. The position measuring system in accordance with claim 14, wherein said linear measuring device is an interferometer.

18. The position measuring system in accordance with claim 17, wherein said light is split into a first partial beam for said angle-measuring apparatus and a second partial beam for said linear measuring device.

* * * * *